US011442892B2

(12) United States Patent
Vallejo et al.

(10) Patent No.: US 11,442,892 B2
(45) Date of Patent: Sep. 13, 2022

(54) FILE AND DATA MIGRATION TO STORAGE SYSTEM

(71) Applicant: MICROSOFT TECHNOLOGY LICENSING, LLC, Redmond, WA (US)

(72) Inventors: Alexander M. Vallejo, Seattle, WA (US); Mark Mahony, Redmond, WA (US); Christopher Alexander Lomond, Mississauga (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 338 days.

(21) Appl. No.: 16/010,310

(22) Filed: Jun. 15, 2018

(65) Prior Publication Data

US 2019/0258726 A1 Aug. 22, 2019

Related U.S. Application Data

(60) Provisional application No. 62/634,155, filed on Feb. 22, 2018.

(51) Int. Cl.
*G06F 16/11* (2019.01)
(52) U.S. Cl.
CPC .......... *G06F 16/122* (2019.01); *G06F 16/119* (2019.01)
(58) Field of Classification Search
CPC ..... G06F 16/119; G06F 16/125; G06F 16/122
See application file for complete search history.

(56) References Cited

U.S. PATENT DOCUMENTS

| 5,991,753 | A | 11/1999 | Wilde | |
|---|---|---|---|---|
| 6,757,698 | B2* | 6/2004 | McBride | G06F 11/1464 |
| 7,702,781 | B2* | 4/2010 | Devolites | G06F 16/1824 709/224 |
| 8,266,109 | B1 | 9/2012 | Bilsborough | |
| 8,285,817 | B1* | 10/2012 | Balasubramanian | G06F 16/119 709/219 |
| 9,031,912 | B1 | 5/2015 | Rogers et al. | |
| 2006/0259521 | A1* | 11/2006 | Armenta | G06F 16/182 |
| 2009/0228531 | A1* | 9/2009 | Baumann | G06F 16/11 |
| 2017/0180424 | A1* | 6/2017 | Hardee | G06F 16/16 |

OTHER PUBLICATIONS

SuperUser.com, Gani Simsek, https://web.archive.org/web/20130703220435/https://superuser.com/questions/216704/how-to-copy-files-that-have-too-long-of-a-filepath-in-windows, Mar. 7, 2013, 3 pp. (Year: 2013).*

(Continued)

*Primary Examiner* — Marc S Somers
(74) *Attorney, Agent, or Firm* — Newport IP, LLC; Han K. Gim

(57) ABSTRACT

Techniques for data migration from a local computing device to a storage associated with a storage provider are provided. Prior to initiating data migration from a local computing device to the storage, analysis of files and/or data for migration is performed to determine if a migration exclusion criterion exists in relation to files and/or data for migration. Migration may be allowed for the files and/or data in the absence of a determination that the migration exclusion criterion applies to the files and/data for migration to the storage.

20 Claims, 8 Drawing Sheets

(56) References Cited

OTHER PUBLICATIONS

Beigi, et al., "Policy-Based Information Lifecycle Management in a Large-Scale File System", In Proceedings of In Sixth IEEE International Workshop on Policies for Distributed Systems and Networks (Policy'05), Jun. 6, 2005, 10 Pages.
"International Search Report and Written Opinion Issued in PCT Application No. PCT/US19/017733", dated Apr. 25, 2019, 12 Pages.
"Office Action Issued in European Patent Application No. 19707976.7", dated Feb. 11, 2022, 7 Pages.

* cited by examiner

FILE AND DATA MIGRATION TO STORAGE SYSTEM

RELATED APPLICATION

This application claims priority to U.S. Provisional Patent Application No. 62/634,155, filed on Feb. 22, 2018 and titled "ENHANCED USER EXPERIENCES BASED ON PREDICTIVE FILE SYSTEM CHECKS," the entire disclosure of which is incorporated in its entirety by reference herein.

BACKGROUND

With the ever-increasing need for data storage in computer systems, the use of storage providers (e.g., network accessible distributed storage services) is increasing. A storage provider may provide distributed storage services in which a file or file directories are stored in a network accessible or distributed storage rather than on a user's local computing device. When a file or directory is needed, it can be pulled from the distributed storage service back onto the user's local computing device.

Some storage providers provide software that may be installed one a user's computing device. The software, once installed, manages the storage and retrieval of files to/from distributed storage and the syncing of data between the local computing device and the distributed storage.

Unfortunately, with distributed storage, the conventional process of migrating, accessing and working with files is not as seamless as when those files are stored locally on the computing device. Furthermore, migrating files and associated data from a user's local computing device to the distributed storage is a task that requires time-consuming user attention, and the result of the file migration may result in an undesirable user experience. For example, a user may elect to move or migrate one or more files and associated data to a location that the synchronized to distributed storage. Subsequently, after the one or more files are moved, the user may find that an application is unable to process one or more of the moved files in a predictable manner. Therefore, the process of moving one or more files and associated data to the location that is synchronized to distributed storage may result in data loss, data corruption, or unpredictable application behavior when the application attempts to access one or more of the moved files.

Therefore, there remains a need to provide a reliable file and associated data storage migration technique that reduces storage consumption on a local computing device, while simultaneously providing a positive user experience ensuring dependable and predictable file and associated data use after migration.

SUMMARY

The technologies described herein address the technical need to increase the amount of local storage available to a local computing device. In some instances, abundant local storage available to a computing device enhances performance of a processor and the physical storage associated with the local computing device.

To address at least this technical need, technologies described herein provide enhanced data migration techniques that streamline migrating files and associated data from a local computing device storage to storage associated with a storage provider, such as a network accessible storage provider. In some instances, the enhanced data migration techniques significantly reduce the amount of user interaction with the local computing device required to initiate and complete migration of files and associated data to the storage provider.

At least one benefit of the described data migration technologies is the reduction of unnecessary processor overhead associated with a local computing device that possesses data storage that is at capacity or approaching capacity. The elimination of unnecessary processor overhead reduces battery drain and eliminates unnecessary memory use associated with computing devices.

Technologies are disclosed herein that provide enhanced file migration from a local computing device to a storage associated with a storage provider (e.g., a network accessible storage service). Prior to performing file migration from the local computing device to the storage, the disclosed technologies analyze the file for migration to determine if a migration exclusion criterion exists in relation to the file to be migrated. The disclosed technologies allow migration of the file in the absence of a determination that the migration exclusion criterion applies to the file for migration to the storage.

For example, the disclosed technologies can analyze the file for migration to identify if the file comprises at least one attribute corresponding to the migration exclusion criterion. The file is prevented from being migrated to the storage when the data is found to include the at least one attribute corresponding to the migration exclusion criterion.

In some implementations, the disclosed technologies that provide enhanced data migration may analyze files for possible migration to a storage. For example, in some implementations, one or more file locations, such as file directories associated with a local computing device, are analyzed for files that may be migrated to the storage. The analysis may be done without action on the part of a user of the local computing device. In some implementations, the analysis is performed as part of a computer background process insulated from a user of the local computing device.

Analysis of the one or more file locations and the associated files is executed to determine if a migration exclusion criterion exists in relation to the files associated with the one or more file locations. In the absence of the migration exclusion criterion, the disclosed technologies may request authorization from a user of the local computing device to execute migration of the files associated with the one or more file locations. The authorization request may be made via a user interface ("UI") associated with the local computing device.

In some implementations, the disclosed technologies provide enhanced file migration from a local computing device to a storage implement a plurality of predetermined migration exclusion criteria. For example, the plurality of predetermined migration exclusion criteria may include a maximum file size in bytes, a maximum computer filename length, at least one improper computer file type identified by one or more file extensions, improper computer filename or character associated with filename, file reparse point observed, and so forth. The disclosed technologies analyze the one or more computer files for migration to determine if one or more of the foregoing predetermined migration exclusion criteria exist in relation to the Feil for migration. The disclosed technologies allow migration of the files in the absence of the predetermined migration exclusion criteria.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
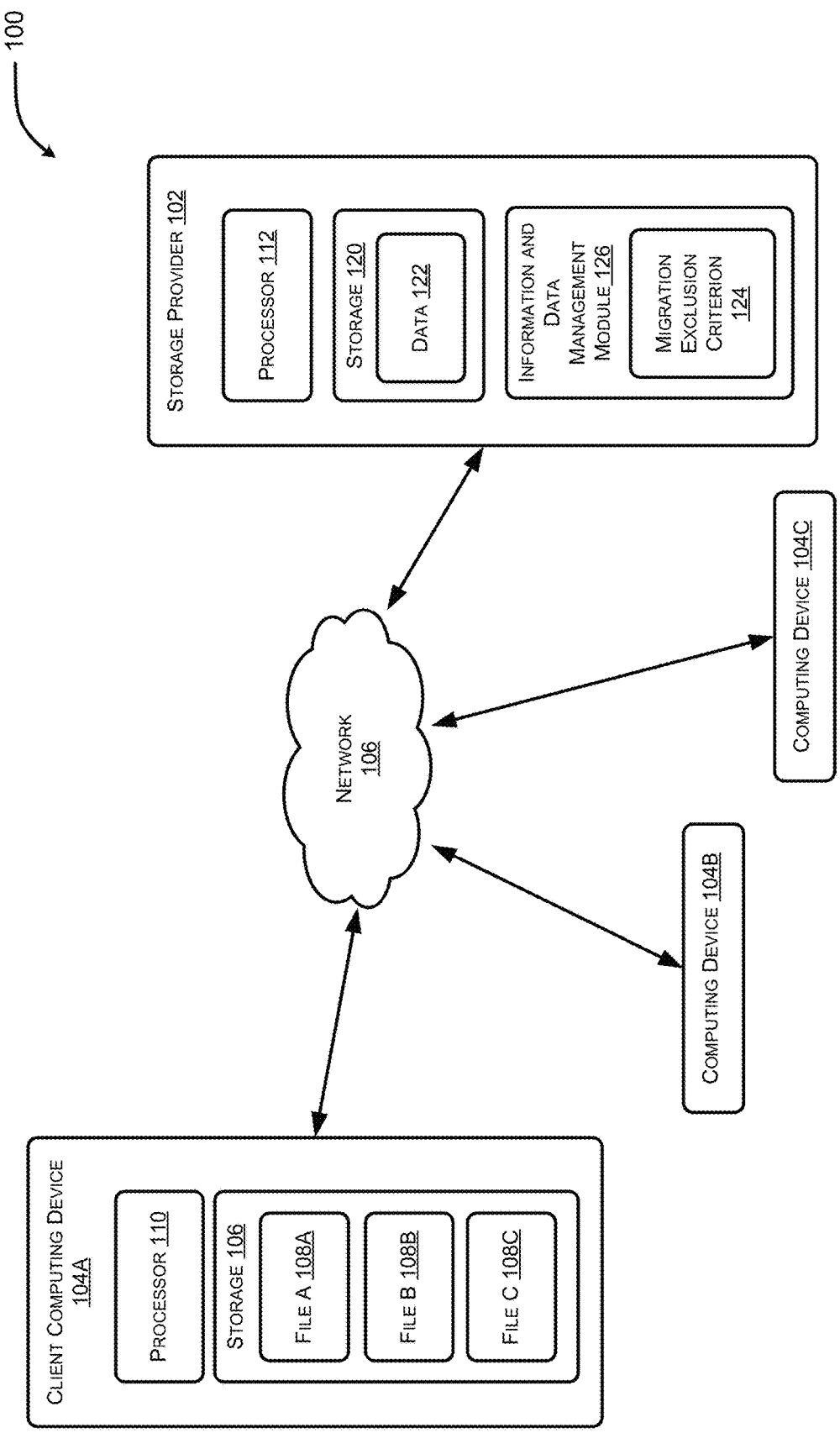
FIG. 1 is a block diagram illustrating an example computing environment that may include computing devices associated with described computer file migration technologies.

At least some of the disclosed technologies provide enhanced file migration from a local computing device to a storage associated with a storage provider (e.g., a network-accessible storage service). In some implementations, the disclosed technologies analyze one or more computer files having associated data prior to executing migration of the one or more computer files from a local computing device to a storage system. The disclosed technologies analyze the one or more computer files for migration to determine if a migration exclusion criterion exists in relation to the file for migration. The disclosed technologies allow migration of the file in the absence of a determination that the migration exclusion criterion applies to the file for migration to the storage.

At least one benefit of the described data migration technologies is the reduction of unnecessary processor overhead associated with a computing device that possesses data storage that is at capacity or approaching capacity. The elimination of unnecessary processor overhead reduces battery drain and reduces unnecessary memory use associated with computing devices. Other technical benefits not specifically identified herein can also be realized through implementations disclosed in the following.

In some implementations, prior to initiating file migration from the local computing device to the storage, the disclosed technologies analyze the file for migration to determine if a migration exclusion criterion exists in relation to the file for migration. The disclosed technologies allow migration of the file when it is determined that the migration exclusion criterion does not apply to the file for migration to the storage.

In some implementations, the disclosed technologies that provide enhanced file migration may analyze files for possible migration to a storage. For example, in some implementations, one or more file locations, such as file directories associated with a local computing device, are analyzed for files that may be migrated to the storage. The analysis may be done without action on the part of a user of the local computing device. In some implementations, the analysis is performed as part of a computer background process that is insulated from a user of the local computing device.

Analysis of the one or more file locations and the associated files is executed to determine if a migration exclusion criterion exists in relation to the files associated with the one or more file locations. In the absence of the migration exclusion criterion, the technologies may request authorization from a user of the local computing device to execute migration of the files associated with the one or more file locations. The authorization request may be made via a user interface ("UI") associated with the local computing device.

In some implementations, the disclosed technologies that provide enhanced file migration from a local computing device to a storage implement a plurality of predetermined migration exclusion criteria. For example, the plurality of predetermined migration exclusion criteria may include excluded or improper computer file type (e.g. file extension type), maximum computer file size, maximum file path length, file reparse point observed, excluded or improper filename, and so forth. The disclosed technologies analyze the one or more computer files for migration to determine if one or more of the foregoing predetermined migration exclusion criteria exist in relation to the file for migration. The disclosed technologies allow migration of the file in the absence of a determination that the predetermined migration exclusion criteria apply to the file for migration.

Various examples, implementations, scenarios, and aspects are described below with reference to FIGS. 1 through 7.

Before describing exemplary techniques for providing enhanced data migration to a storage provider (e.g., network-accessible storage service) and one or more storages associated with the storage provider, an example of a suitable use environment is described with reference to FIG. 1, which shows an example computing system 100.

FIG. 1 illustrates an example system 100 implementing a storage provider, also referred to herein as a network accessible storage provider, in accordance with one or more embodiments. The system 100 includes a storage provider 102 and various devices 104A-104C that can communicate with one another, as well as with the storage provider 102, via a network 106. The network 106 can be a variety of different networks, including the Internet, a local area network (LAN), a wide area network (WAN), a personal area network, a cellular or other phone network, an intranet, other public and/or proprietary networks, combinations thereof, and so forth. It should be noted that network 106 can be configured to include multiple networks.

The devices 104 can be a variety of different types of devices. For example, in the system 100 each of the devices 104 may be one of a laptop or netbook computer device, a cellular or other wireless phone (e.g., a smartphone) device, a tablet or notepad computer, a printer, a desktop computer, a television or other display device, a cloud service (e.g., an online service storing audio/video content for playback, and/or an online gaming service), and so forth.

The devices 104 illustrated in the system 100 are examples of devices, and various other types of devices can also be included in the system 100 such as a server computer, a mobile station, an entertainment appliance, a set-top box communicatively coupled to a display device, a game console, an automotive computer, a scanner, a facsimile machine, a wireless headset (e.g., a Bluetooth® headset), and so forth.

The storage provider 102 (which might be referred to simply as "the provider 102") provides a network service that can be accessed by a user via a network (e.g., network 106 in the example of FIG. 1). The storage provider 102 is implemented using one or more of a variety of different types of devices, including one or more of the same types as devices 104 and/or other types of devices (e.g., distributed or co-located server computers).

The storage provider 102, in particular, may be implemented as a distributed computing environment that comprises one or more storage devices (e.g., storages) that are co-located and/or located in disparate geographical areas. The one or more storage devices may be coupled together by way of a network, such as the network 106.

The provider 102 includes an information and data management module 126 and a user data storage 120. The module 126 manages storage and retrieval of data 122 for devices (e.g., one or more of the devices 104) for each of multiple users of system 100. The user data storage 120 stores the data 122 for the devices 104 for each of multiple users of system 100. The data 122 may be in the form of files having been migrated from one or more of the devices 104. The data 122 may also include computer executable instructions, such as computer executable instructions associated with one or more software applications, and the like. The data 122 may include one or more of files 108A-108C that have been migrated to the storage provider 102 and stored within the storage 120 as the data 122.

Device information for one or more devices 104 that are associated with a user can be saved (not illustrated in FIG. 1) to the storage provider 102 as associated with a user account of that user. A device 104 associated with a user is a device that the user is authorized to use, such as a device owned by the user, a device provided to the user (e.g., a work computer), a collection of devices that the user pays to use or has an account with (e.g., an online printing service), and so forth. The module 126 may receive the device information for a device 104 associated with a user account of the storage provider 102 and store the device information in the storage 120 as associated with that user account. The user can subsequently log in to his or her user account using one of devices 104, and have that device access the data 122 associated with the user account in the storage 120.

Each of the client computing devices 104 may comprise a processor 110. The processor 110 may be coupled to the storage 106. In some implementations, the processor 110 is functional to execute computer-executable instructions (not illustrated in FIG. 1) that may be included in the storage 106 or other one or more storages associated with the client computing devices. Similarly, the storage provider 102 may comprise a processor 112. In some implementations, the processor 112 is functional to execute computer-executable instructions (not illustrated in FIG. 1) that may be included in the storage 120 or other one or more storages associated with the storage provider 102.

In some implementations, the information and data management module 126 organizes migration of files from the client computing devices 104 to the storage provider 102. In some implementations, migration of files from the client computing devices 104 is determined based on at least one migration exclusion criterion 124 implemented by the module 126. Specifically, the storage provider 102 in conjunction with the module 126 may analyze the files stored in the storage 106, based on the at least one migration exclusion criterion 124, to determine if the files stored in the storage 106 may be migrated to the storage provider 102 and stored within the storage 120.

In accordance with the technologies described herein, files migrated from the client computing device 104 to the storage provider 102 may remain on the client computing device 104 after the files are migrated to the storage provider 102. Therefore, the event that the client computing device 104 is disconnected from the storage provider 102, a copy of the migrated files remains accessible to the client computing device 104.

File synchronization is maintained for files that are migrated to the storage provider 102 from the client computing device 104. File synchronization is a process of ensuring that computer files in two or more file locations are updated according to certain rules.

In one-way file synchronization, updated files are copied from a source location (e.g., a hard drive of device 104) to one or more target locations (e.g., distributed storage location, such as the provider 102). However, no files are copied back from the target locations to the source location. In one-way file synchronization, files may be copied back to the source location from the target locations when the source location disconnects from the target locations. Files copied back to the source location at or before disconnection may be synchronized back to the target locations from the source locations when the source location reconnects with the target locations.

In two-way file synchronization, updated files are copied in both directions, usually with the purpose of maintaining identical copies at the all locations.

In other implementations, files migrated from the client computing device 104 to the storage provider 102 do not remain on the client computing device 104. In such a scenario, the client computing device 104 accesses the storage provider 102 when use of the migrated files is needed. In the event that the client computing device 104 disconnects from the service provider 102, the client computing device 104 may retrieve a copy of the migrated files from the storage provider 102 prior to disconnection.

In some implementations, files stored in the storage 106 that possesses an attribute that corresponds to the migration exclusion criterion 124 will be prevented from being migrated to the storage provider 102 by way of the module 126. Additional details related to file migration will be provided in the following disclosure.

FIG. 1 illustrates that the storage provider 102 includes the information and data management module 126 as well as the migration exclusion criterion 124. However, it is to be understood that one or more of the computing devices 104 may implement the management module 126 and the migration exclusion criterion 124. Specifically, one or more of the computing devices 104 may implement the data migration techniques that are described in connection with the storage provider 102.

Figure 2:
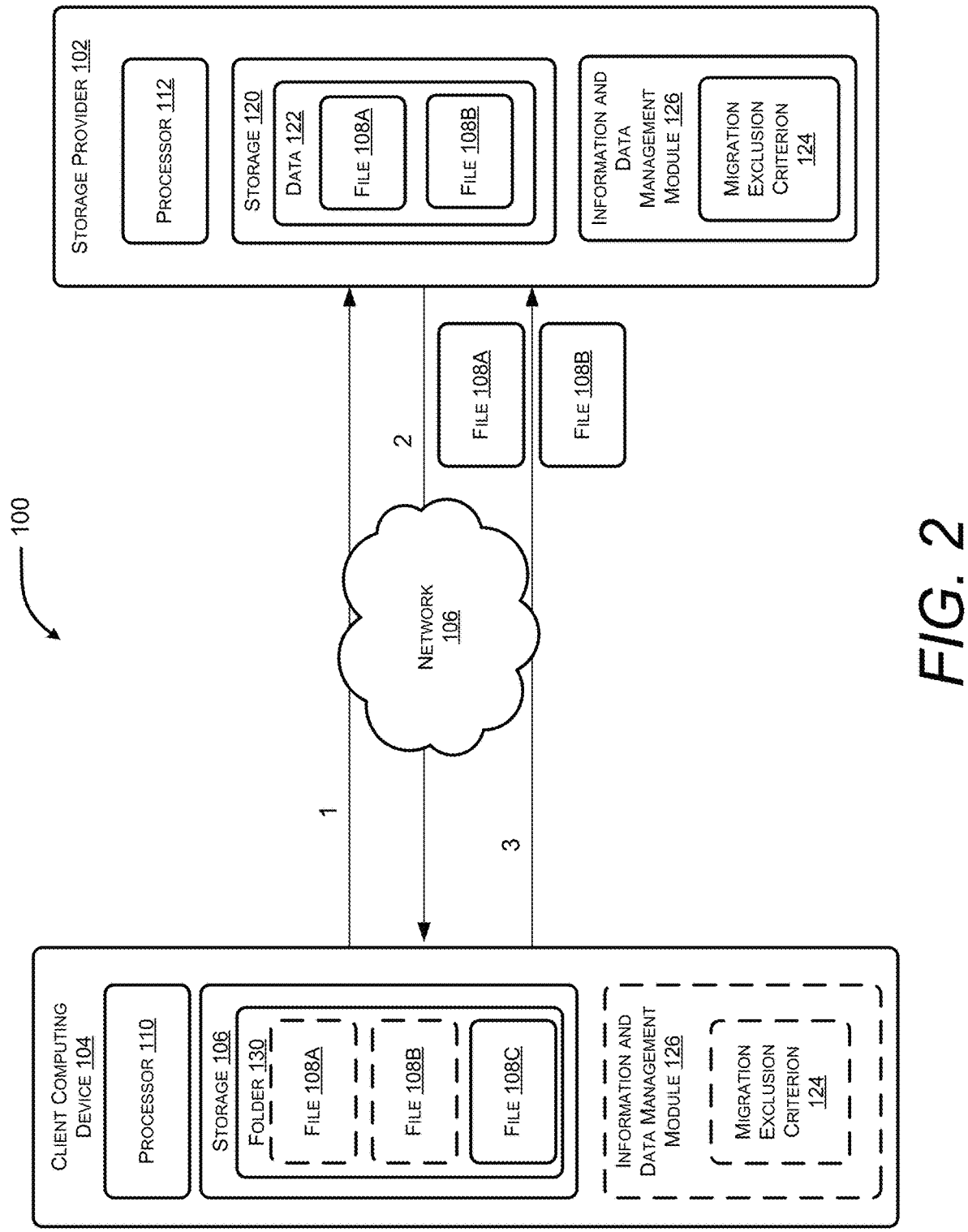
FIG. 2 is a block diagram providing additional details of an example computing environment, such as the example computing environment illustrated in FIG. 1.

FIG. 2 illustrates additional details and functionalities associated with the client computing device 104 and the storage provider 102. At communication 1, the client computing device 104 provides a request to migrate files, such as one or more computer files 108A-108C, to the storage provider 102. The request to migrate files may be initiated by a user of the computing device 104. Alternatively, the request may be made autonomously by the computing device 104. Specifically, the request to migrate files may be made without the action on the part of a user of the computing device 104. For example, the request to migrate files may be made by a computer background process, defined by computer executable instructions, that is executed by the processor 110 and/or the processor 112. The computer background process may be insulated from a user of the computing device 104.

In some implementations, distributed storage application functioning on the client computing device 104, such as the information and data management module 126, may initiate the communication 1 and/or any of the additional communications described in the following. For example, the computing device 104 may implement the information and data management module 126 and the migration exclusion criterion 124, as shown in FIG. 2.

The module 126 and criterion 124 may be obtained by the computing device 104, from the storage provider 102, as part of a process that installs distributed storage application software on the computing device 104, which manages the migration, storage and retrieval of files to/from the storage provider 102 and the syncing of files between the computing device 104 and the storage provider 102. The module 126 and criterion 124 may be part of the distributed storage application software. In some implementations, the module 126 and the criterion 124 are part of an operating system of the client computing device 104 or the storage provider 102.

The information data management module 126 and the migration exclusion criterion 124 are illustrated with the dash-line boxes, as the computing device 104 may execute the described data migration by way of interaction with the storage provider 102 in the event that the storage provider software is not installed on the computing device 104. For example, in some implementations, the information and data management module 126 functioning on the storage provider 102 may cause the client computing device 104 to initiate the communication 1 and/or any of the additional communications described in the following.

At communication 2, the storage provider 102 and the information data and management module 126 communicates the migration exclusion criterion 124 to the cloud computing device 104. In some implementations, a plurality of migration exclusion criteria 124 is provided to the computing device 104. The cloud computing device 104 may alternatively already have stored in the storage 106 the migration exclusion criterion 124 and/or a plurality of migration exclusion criteria 124.

The computing device 104 may use the migration exclusion criterion 124 to determine if one or more of the files 108 may be migrated from the storage 106 to the storage 120 of the storage provider 102. Use of the migration exclusion criterion 124 by the computing device 104 may be caused by the storage provider 102 in conjunction with the management module 126.

Specifically, at communication 2, the storage provider 102 causes the client computing device 104 to analyze at least one of the files 108A-108C stored in the storage 106 in view of the migration exclusion criterion 124. The analysis is made to determine if at least one of the files 108A-108C is to be prevented from being migrated from the storage 106 to the storage 120 based on the determination that at least one of the files 108A-108C possesses an attribute that corresponds to the migration exclusion criterion 124.

In some implementations, the migration exclusion criterion 124 defines one or more excluded or improper file types (e.g. using file extension type, such as .pst, .ost, .sln, .one, and the like), maximum computer file size bytes (e.g., 10 MB), maximum file path length defined by a maximum number of characters permissible in a file path (e.g., maximum of 40 characters in file path), maximum computer filename defined by a maximum number of characters permissible in the filename (e.g., maximum of 20 characters in filename), file reparse point detected in computer file for migration, excluded or improper filename defined by one or more excluded or improper characters in suffix of filename (e.g., &, ., #, %, and the like), and so forth.

In some implementations, one or more files 108A-108C stored in the storage 106 that are prevented from being migrated based on the migration exclusion criterion 124 remain in the storage 106, while one or more files 108A-108C that are not prevented from being migrated based on the migration exclusion criterion 124 are migrated and stored in the storage 120 as data 122.

Communication 3 shows migration of file 108A and file 108B from the client computing device 104 to the storage provider 102, based on the determination that file 108A and file 108B each do not comprise an attribute that corresponds to the migration exclusion criterion 124. As illustrated, at least one file, file 108C, remains in the storage 106. The file 108 was prevented from being migrated to the storage provider 102 because it comprises an attribute that corresponds to, matches, or substantially matches the migration exclusion criterion 124.

In some implementations, a copy of file 108A and file 108B remain on the client computing device 104. The migrated files 108A and 108B are synchronized to the copy of the files 108A and 108B that remain on the client computing device 104.

In some implementations, the migration exclusion criterion 124 may be used by the client computing device 104 to analyze computer files associated with at least one distinct computer folder 130 (e.g., documents folder, pictures folder, desktop folder, and the like) associated with the client computing device 104. Migration of computer files associated with the distinct computer folder 130, in some implementations, may be permitted only when none of the files contained in a folder are to be prevented from being migrated based on the migration exclusion criterion 124. This unique "all or nothing" file migration approach streamlines the file migration process to reduce the amount of user interaction required to implement file migration from the client computing device 104 to the storage provider 102.

Furthermore, as indicated in the foregoing, the migration exclusion criterion 124 may be used by the client computing device 104 to analyze computer files associated with the at least one distinct computer folder 130 (e.g., documents folder, pictures folder, desktop folder, and the like) associated with the client computing device 104. This analysis may be done autonomously, and in some embodiments without action on the part of a user associated with the computing device 104. In some implementations, anonymous analysis of one or more files associated with a computer folder is revealed to a user of the computing device 104 after it is found that a majority or all of the one or more files associated with the computer folder would not be prevented from being migrated from the computing device 104 to the storage provider 102 based on the migration exclusion criterion 124.

Figure 3:
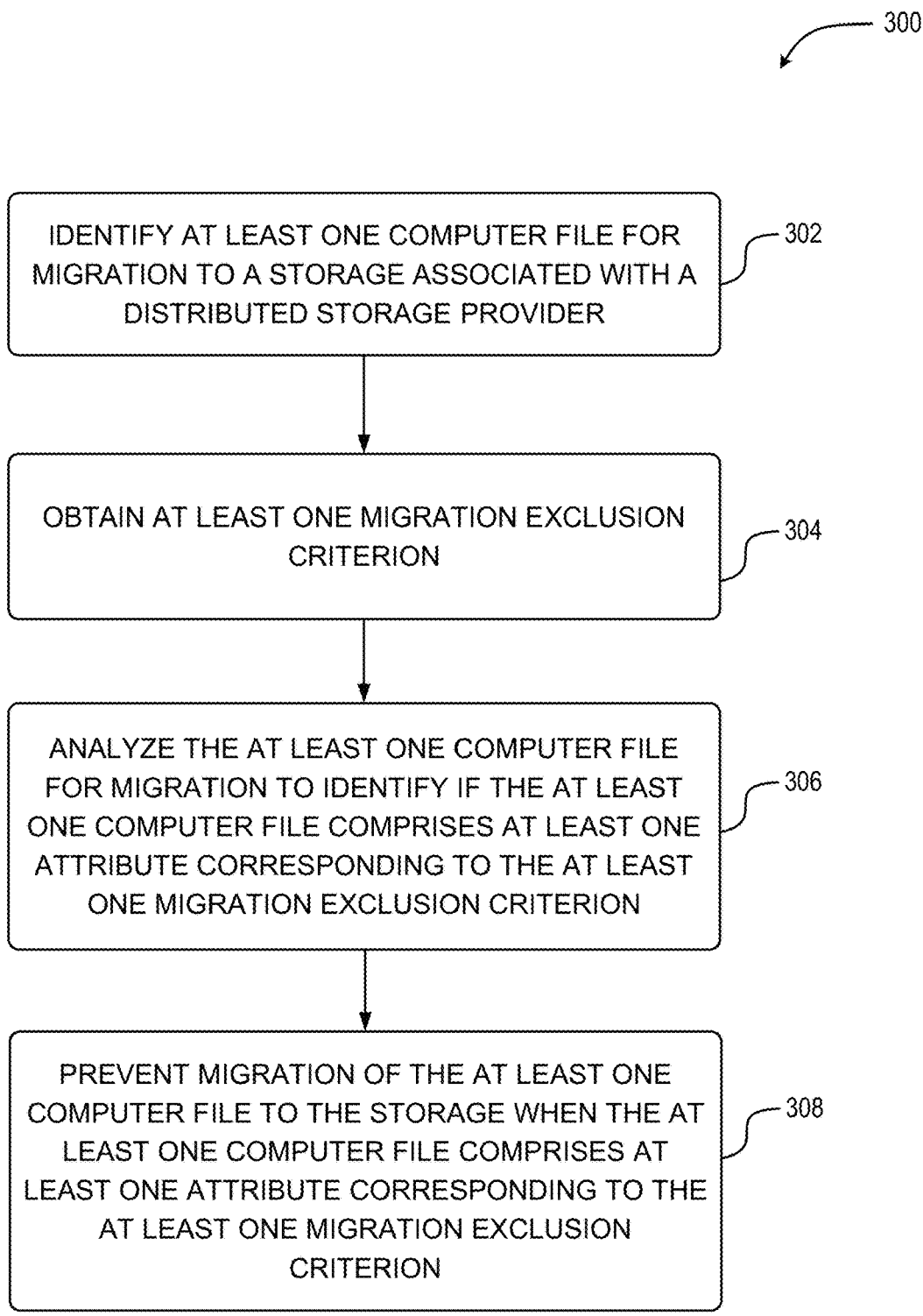
FIG. 3 illustrates a flow chart diagram relating to operations associated with the described computer file migration techniques.

FIG. 3 is a diagram of an example flowchart 300 that illustrates operations associated with migration of files and associated data from a client computing device to a storage provider. In some implementations, the operations of FIG. 3 can be performed by components of one or more computing devices, such one or more of the client computing devices 104 and/or the storage provider 102. Therefore, the instructions associated with the example flowchart 300 may be executed by one or more processors associated with server-side components (e.g., the storage provider 102) and/or client-side components (one or more of the client computing devices 104).

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the system 100, the computing device(s) 104 and/or, the storage provider 102) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The flowchart 300 begins at operation 302, where at least one computer file for migration to a storage associated with a storage provider is identified. In some implementations, the identification of the at least one computer file is performed by the information and data management module 126 associated with the client computing device 104 and/or the storage provider 102.

In some implementations, the operation 302 identifies multiple computer files for migration to the storage. The multiple computer files for migration to the storage may be associated with a computer folder. The computer folder may be one of a plurality of predetermined computer folders that may be analyzed, based on at least one migration exclusion criteria, for possible migration to the storage associated with the storage provider.

At operation 304, at least one migration exclusion criterion is obtained. The at least one migration exclusion criterion may be obtained from the information and data management module 126 associated with the client computing device 104 and/or the storage provider 102. The at least one migration exclusion criterion may be associated with the information and data management module 126. In some implementations, at operation 304, migration exclusion criteria are obtained. Similarly, the migration exclusion criteria may be obtained from the information and data management module 126 associated with a computing device 104 and/or the storage provider 102.

In some implementations, the migration exclusion criterion and/or the migration exclusion criteria defined one or more excluded file types (e.g. using file extension type, such as .pst, .ost, .sln, .one, and the like), maximum computer file size bytes (e.g., 10 MB), maximum file path length defined by a maximum number of characters permissible in a file path (e.g., maximum of 40 characters in file path), maximum computer filename defined by a maximum number of characters permissible in the filename (e.g., maximum of 20 characters in filename), file reparse point detected in computer file for migration, excluded or improper filename defined by one or more excluded or impermissible characters in suffix of filename (e.g., &, ., #, %, and the like), and so forth.

At operation 306, the at least one computer file for migration is analyzed to identify if the at least one computer file comprises at least one attribute corresponding to, possessing, or matching the at least one migration exclusion criterion. In some implementations, the analysis is performed by the information data management module 126 associated with the computing device 104 and/or the storage provider 102.

At operation 308, the at least one computer file is prevented from being migrated to the storage when the at least one computer file comprises at least one attribute corresponding to, possessing, or matching the at least one migration exclusion criterion. In some implementations, the exclusion is performed by the information data management module 106 associated with the computing device 104 and/or the storage provider 102.

In some implementations, one or more of the operations 302-308 are performed as a computer background process that is insulated or hidden from a user. Specifically, the operations 302-308 may be performed autonomously by an operating system, such as the MICROSOFT WINDOWS operating system, software application, such a storage software application (e.g. MICROSOFT ONEDRIVE), and so forth.

At any stage preceding, during, and/or subsequent the processing of operations 302-308, a UI may be presented to the user, on a display device associated with a computing device, showing the commencement of one or more of the operations 302-308, the ongoing execution of one or more of the operations 302-308 and/or at the conclusion of operation 302-308 and in advance of performing migration of files from the computing device 104 to the storage provider 102. The UI may request user authorization and confirmation to execute migration of one or more computer files that were not prevented from being migrated in view of the migration exclusion criterion or criteria. Several examples of such UIs are described below.

Figure 4:
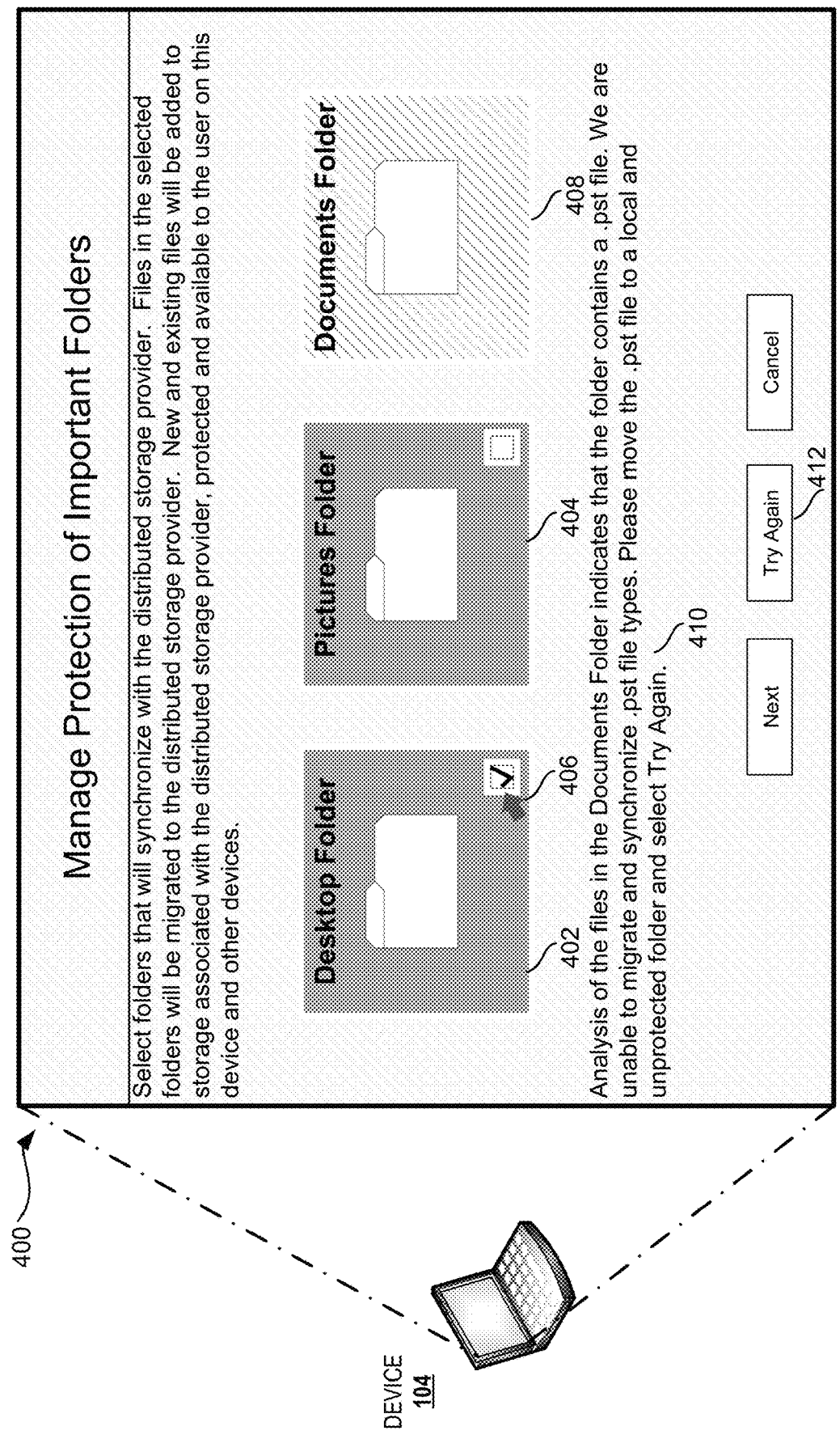
FIGS. 4-6 illustrate exemplary graphical user interfaces ("GUI") that may be displayed on a computing device in conjunction with the described computer file migration techniques.

FIG. 4 illustrates an exemplary UI 400 that may be displayed on a display associated with the client computing device 104. In some implementations, the UI 400 is displayed after the completion of operations 302-308, described in conjunction with FIG. 3.

The UI 400 identifies a plurality of folders 402 and 404 that include files that may be migrated to the storage provider 102. A user of the client computing device 104 may select migration of the files in the plurality of folders 402 and 404 using a mouse pointer 406. The UI 400 also shows a folder 408 that includes at least one file that is not available for migration in accordance with the analysis performed by the operations 302-308. The UI 400 indicates by way of the text 410 that the user may select the "Try Again" button 412 after removing the identified file type that may not be migrated to the storage provider 102.

Figure 5:
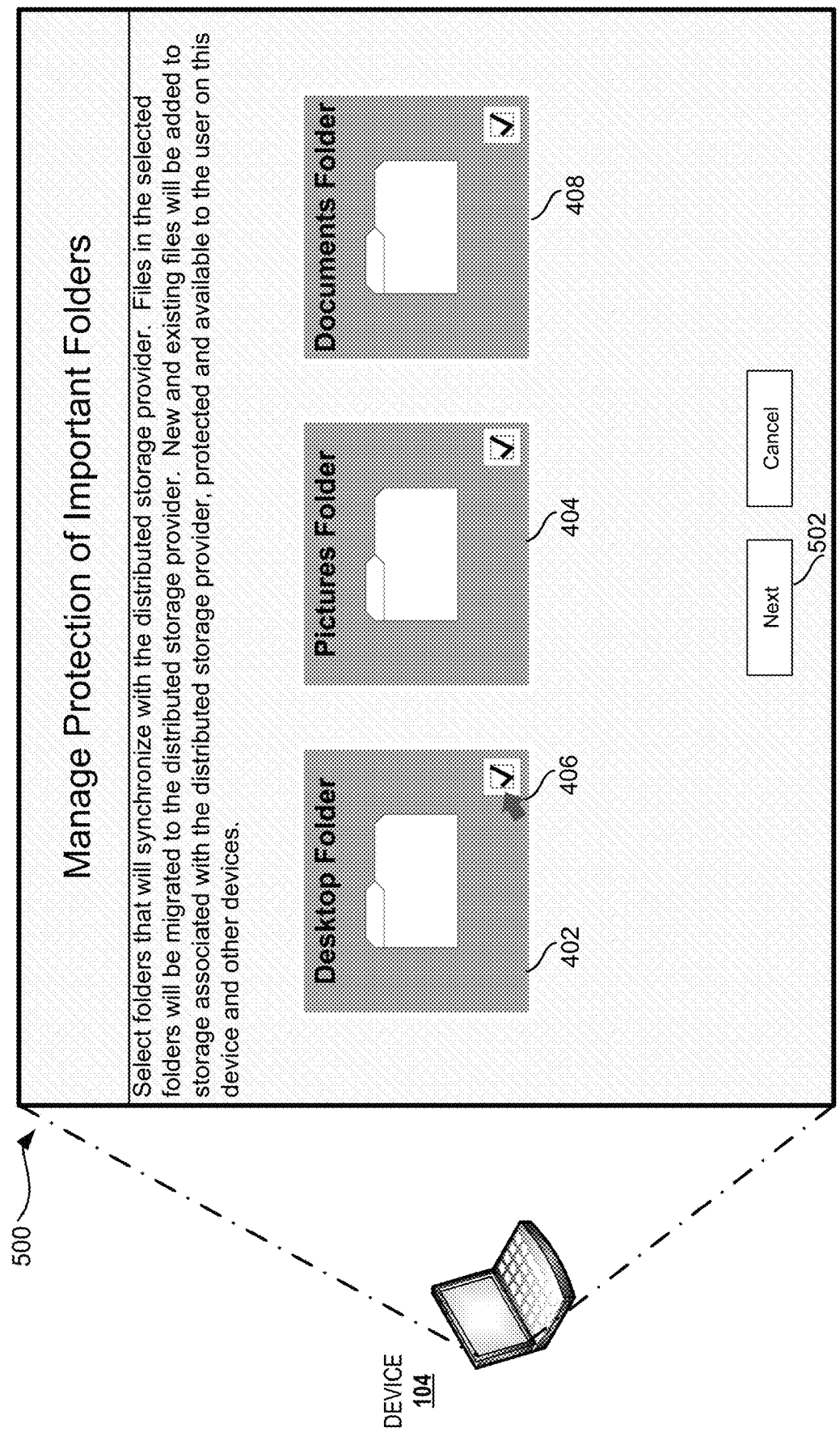

FIG. 5 illustrates an exemplary UI 500 that may be displayed on a display associated with the client computing device 104. In some implementations, the UI 500 is displayed after the completion of operations 302-308, described in conjunction with FIG. 3, and subsequent to the user removing the un-migratable file(s) from the folder 408 and selecting the button 412 implemented by the UI 400. As illustrated, each of the plurality folders 402, 404 and 408 now comprise files that may be migrated to the storage provider 102. The user of the UI 500 may select the "Next" button 502 to migrate the files associated with the folders 402, 404, and 408 to the storage provider 102.

Figure 6:
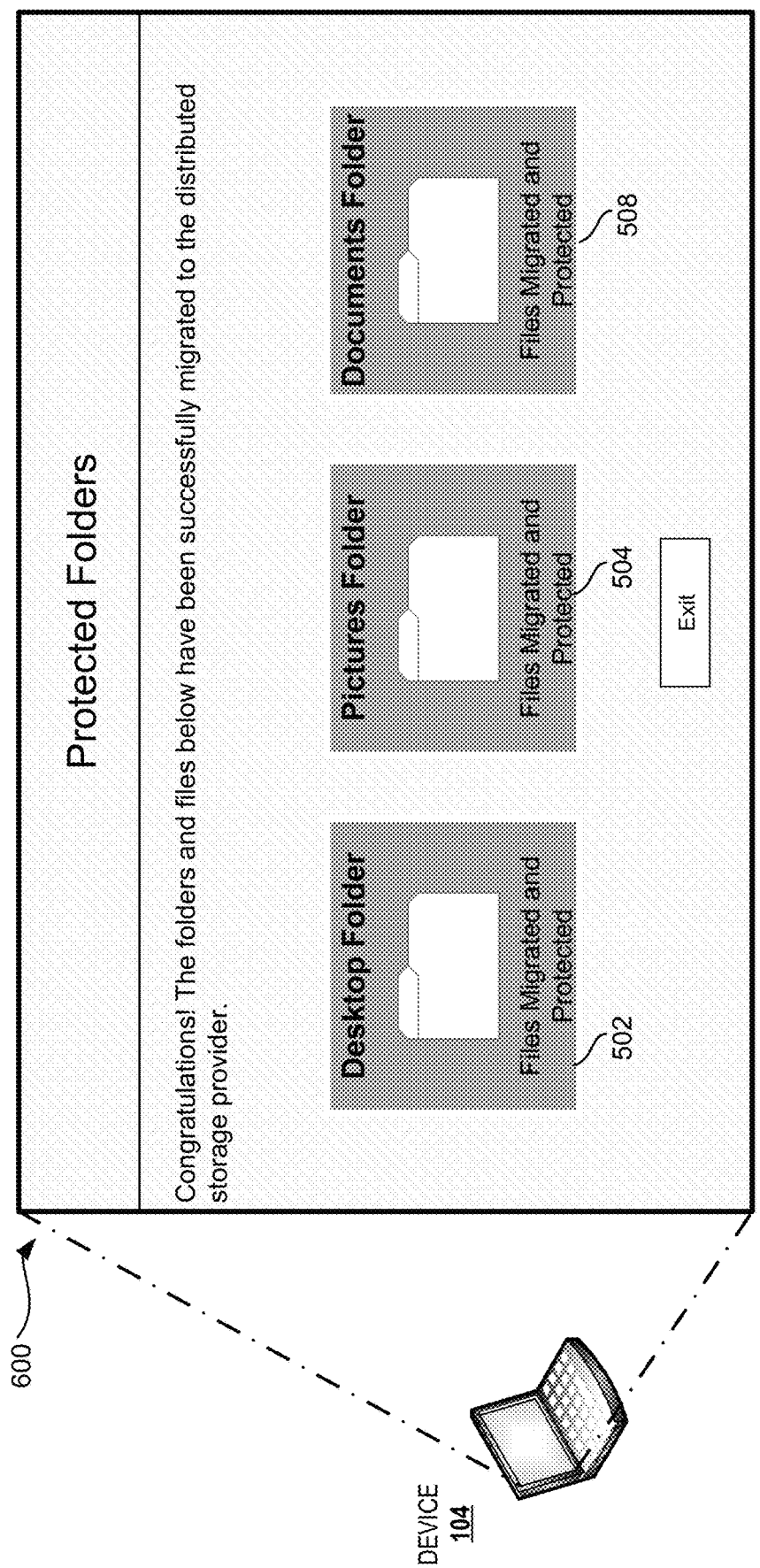

FIG. 6 illustrates an exemplary UI 600 that may be displayed on a display associated with the client computing device 104. The exemplary UI 600 informs the user of the UI 600 that the files associated with each of the folders 502, 504 and 508 have been migrated to the storage provider 102.

Figure 7:
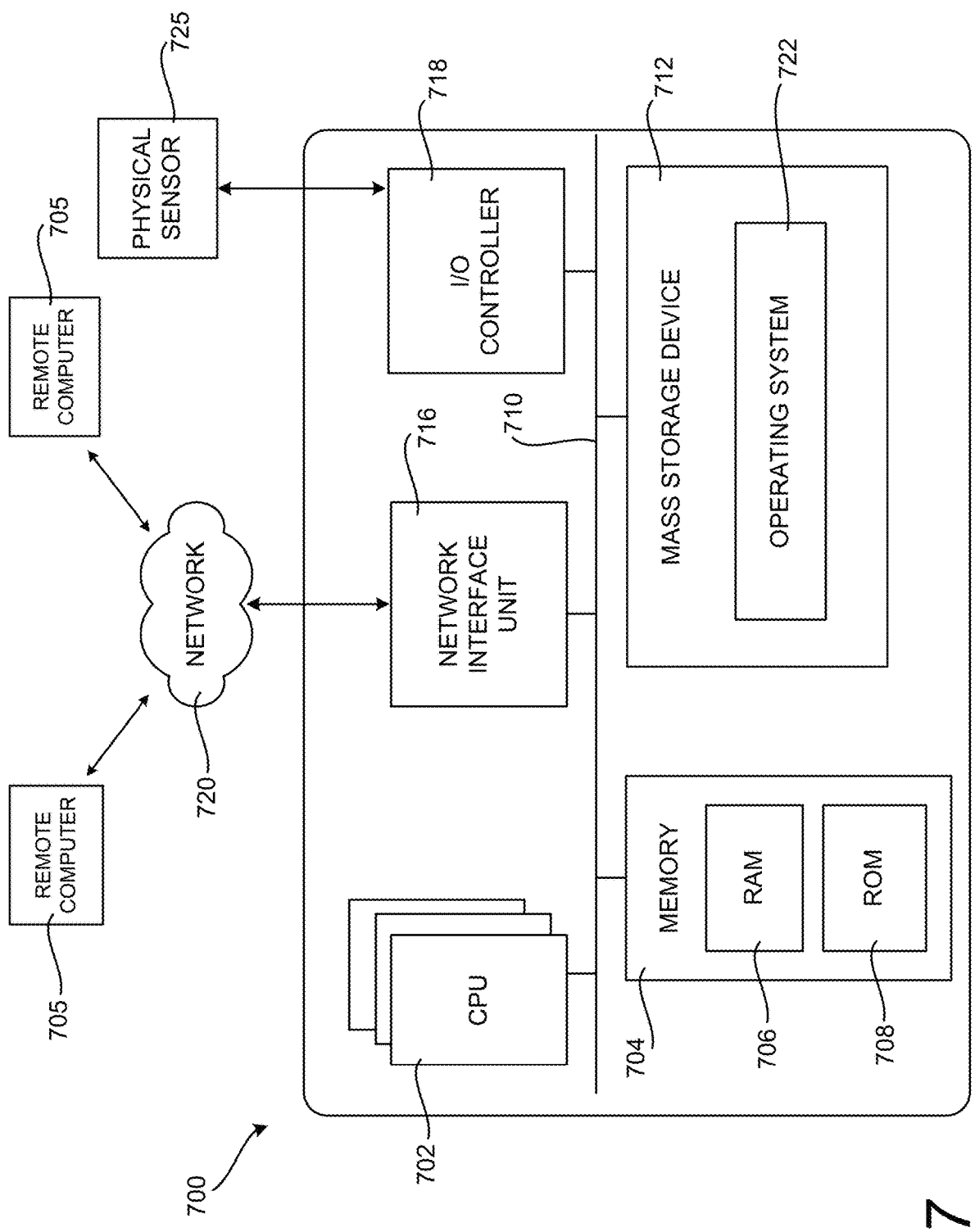
FIG. 7 is a computer architecture diagram showing an illustrative computer hardware and software architecture for a computing device that can implement aspects of the technologies presented herein.

FIG. 7 is a computer architecture diagram showing an illustrative computer hardware and software architecture for a computing device 700 that can implement the various technologies presented herein. In particular, the architecture illustrated in FIG. 7 can be utilized to implement a server computer, mobile phone, an e-reader, a smartphone, a desktop computer, an AR/VR device, a tablet computer, a laptop computer, or another type of computing device. In some implementations, the client computing devices 104 and the storage provider 102 implement some or all of the elements and functionalities associated with the computing device 700.

The computer 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the computer 700, such as during startup, can be stored in the ROM 708. The computer 700 further includes a mass storage device 712 for storing an operating system 722, application programs, and other types of programs. The mass storage device 712 can also be configured to store other types of programs and data.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 720. In some implementations, the network 106 provides at least some or all of the same functionalities as the network 720. The computer 700 can connect to the network 720 through a network interface unit 716 connected to the bus 710. It should be appreciated that the network interface unit 716 can also be utilized to connect to other types of networks and remote computer systems. The computer 700 can also include an input/output controller 718 for receiving and processing input from a number of other devices, including a keyboard, mouse, touch input, an electronic stylus (not shown in FIG. 7), or a physical sensor such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall computer 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
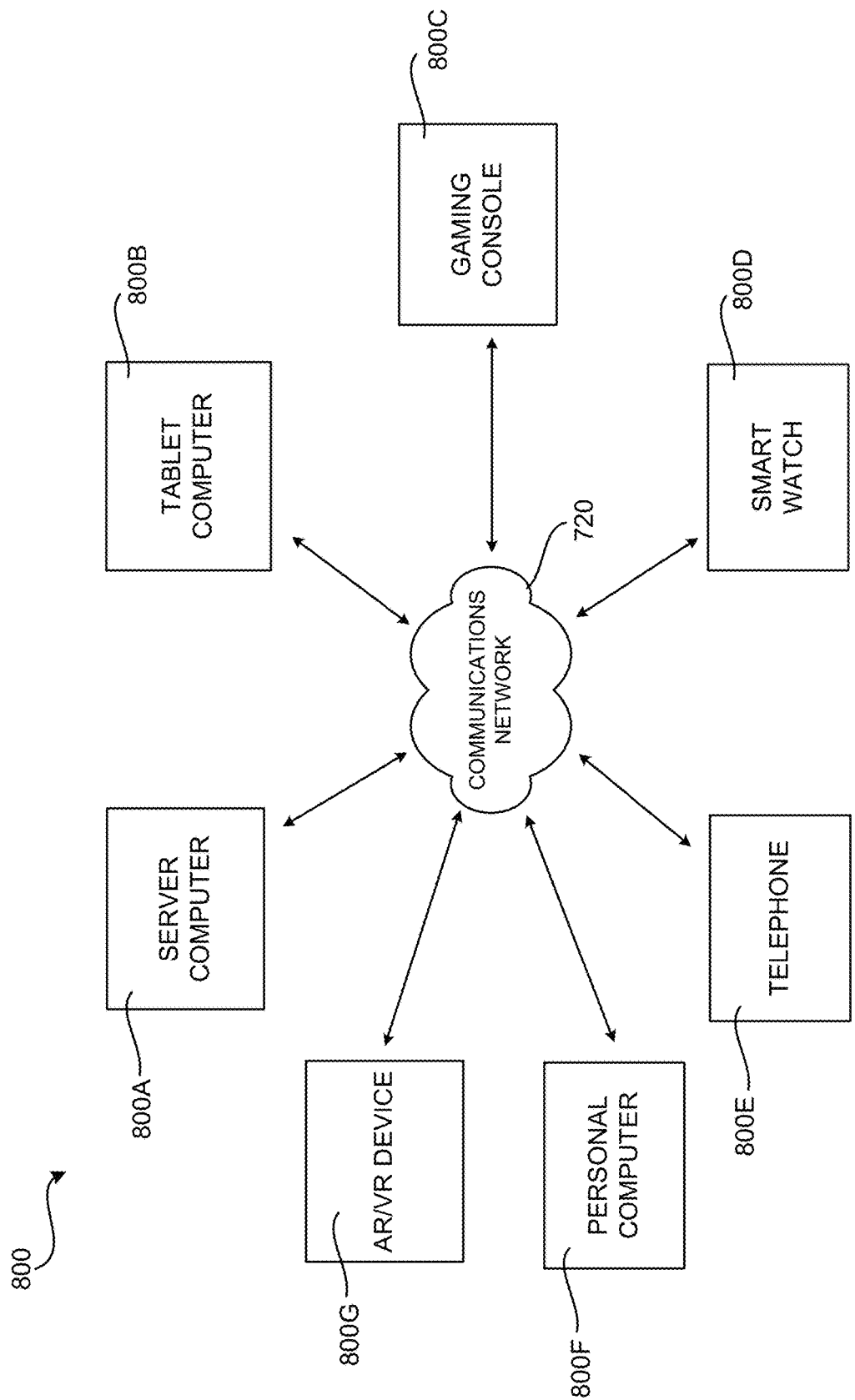
FIG. 8 is a network diagram illustrating a distributed computing environment in which aspects of the disclosed technologies can be implemented.

FIG. 8 is a network diagram illustrating a distributed network computing environment 800 in which aspects of the disclosed technologies can be implemented, according to various embodiments presented herein. The storage provider 102 may implement the distributed network computing environment 800 to provide distributed storage, via one or more distributed physical or virtual storages associated with one or more computing devices, for computing devices and the migration of files and data from the computing devices.

As shown in FIG. 8, one or more server computers 800A can be interconnected via a communications network 720 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 800B, a gaming console 800C, a smart watch 800D, a telephone 800E, such as a smartphone, a personal computer 800F, and an AR/VR device 800G.

In a network environment in which the communications network 720 is the Internet, for example, the server computer 800A can be a dedicated server computer operable to process and communicate data to and from the client computing devices 800B-800G via any of a number of known protocols, such as, hypertext transfer protocol ("HTTP"), file transfer protocol ("FTP"), or simple object access protocol ("SOAP"). Additionally, the networked computing environment 800 can utilize various data security protocols such as secured socket layer ("SSL") or pretty good privacy ("PGP"). Each of the client computing devices 800B-800G can be equipped with an operating system operable to support one or more computing applications or terminal sessions such as a web browser (not shown in FIG. 8), or other graphical user interface (not shown in FIG. 8), or a mobile desktop environment (not shown in FIG. 8) to gain access to the server computer 800A.

The server computer 800A can be communicatively coupled to other computing environments (not shown in FIG. 8) and receive data regarding a participating user's interactions/resource network. In an illustrative operation, a user (not shown in FIG. 8) may interact with a computing application running on a client computing device 800B-800G to obtain desired data and/or perform other computing applications.

The data and/or computing applications may be stored on the server 800A, or servers 800A, and communicated to cooperating users through the client computing devices 800B-800G over an exemplary communications network 720. A participating user (not shown in FIG. 8) may request access to specific data and applications housed in whole or in part on the server computer 800A. These data may be communicated between the client computing devices 800B-800G and the server computer 800A for processing and storage.

The server computer 800A can host computing applications, processes and applets for the generation, authentication, encryption, and communication of data and applications, and may cooperate with other server computing environments (not shown in FIG. 8), third party service providers (not shown in FIG. 8), network attached storage ("NAS") and storage area networks ("SAN") to realize application/data transactions.

It should be appreciated that the computing architecture shown in FIG. 7 and the distributed network computing environment shown in FIG. 8 have been simplified for ease of discussion. It should also be appreciated that the computing architecture and the distributed computing network can include and utilize many more computing components, devices, software programs, networking devices, and other components not specifically described herein.

Example Clauses

The disclosure presented herein encompasses the subject matter set forth in the following clauses.

Clause 1. A computer implemented method, comprising: identifying, by a computing device, at least one computer file for migration to a storage associated with a storage provider; obtaining at least one migration exclusion criterion; analyzing the at least one computer file for migration to identify if the at least one computer file comprises at least one attribute corresponding to the at least one migration exclusion criterion; and preventing migration of the at least one computer file to the storage when the at least one computer file comprises at least one attribute corresponding to the at least one migration exclusion criterion.

Clause 2. The computer implemented method according to Clause 1, further comprising: identifying a computer folder that comprises a plurality of computer files for migration to the storage; analyzing at least one of the plurality of computer files to identify if the at least one of the plurality of computer files comprises at least one attribute corresponding to the at least one migration exclusion criterion; and preventing migration of the plurality computer files to the storage when the at least one of the plurality of computer files comprises at least one attribute corresponding to the at least one migration exclusion criterion.

Clause 3. The computer implemented method according to any of Clauses 1-2, wherein the obtaining comprises obtaining a plurality of migration exclusion criteria, the analyzing comprises analyzing the at least one computer file for migration to identify if the at least one computer file comprises one or more attributes corresponding to at least one of the plurality of migration exclusion criteria, and the preventing comprises preventing migration of the at least one computer file to the storage when the at least one computer file comprises one or more attributes corresponding to at least one of the plurality of migration exclusion criteria.

Clause 4. The computer implemented method according to Clause 3, further comprising: identifying a computer folder that comprises a plurality of computer files for migration to the storage; analyzing at least one of the plurality of computer files to identify if the at least one of the plurality of computer files comprises one or more attributes corresponding to at least one of the plurality of migration exclusion criteria; and preventing migration of the plurality computer files to the storage when the at least one of the plurality of computer files comprises one or more attributes corresponding to at least one of the plurality of migration exclusion criteria.

Clause 5. The computer implemented method according to any of Clauses 1-4, wherein the at least one migration exclusion criterion comprises a maximum file size in bytes, a maximum computer filename length, at least one improper computer file type identified by one or more file extensions, or a maximum computer file path length.

Clause 6. The computer implemented method according to any of Clauses 1-5, wherein the at least one migration exclusion criterion comprises a plurality of migration exclusion criteria, the plurality of migration exclusion criteria including a maximum file size in bytes, a maximum computer filename length, at least one improper computer file type identified by one or more file extensions, and a maximum computer file path length.

Clause 7. The computer implemented method according to Clause 6, wherein the obtaining comprises obtaining the plurality of migration exclusion criteria, the analyzing comprises analyzing the at least one computer file for migration to identify if the at least one computer file comprises at least one attribute corresponding to at least one of the plurality of migration exclusion criteria, and the preventing comprises preventing migration of the at least one computer file to the storage when the at least one computer file comprises at least one attribute corresponding to at least one of the plurality of migration exclusion criteria.

Clause 8. The computer implemented method according to any of Clauses 1-7, further comprising locating one or more computer file folders predetermined for analysis to determine if one or more computer files associated with the one or more computer file folders are compatible for migration to the storage associated with the storage provider, the at least one computer file for migration associated with the one or more computer file folders.

Clause 9. The computer implemented method according to any of Clauses 1-8, further comprising executing the identifying, obtaining, analyzing and preventing acts in association with a computer background process.

Clause 10. A computing device, comprising: a processor; a computer-readable storage medium in communication with the processor, the computer-readable storage medium having computer-executable instructions stored thereupon which, when executed by the processor, cause the processor to: identify at least one computer file for migration to a storage associated with a storage provider; obtain at least one migration exclusion criterion; analyze the at least one computer file for migration to identify if the at least one computer file comprises at least one attribute corresponding to the at least one migration exclusion criterion; and prevent migration of the at least one computer file to the storage when the at least one computer file comprises at least one attribute corresponding to the at least one migration exclusion criterion.

Clause 11. The computing device according to Clause 10, wherein the computer-executable instructions, when executed by the processor, further cause the processor to execute the identify, obtain, analyze and prevent acts in association with a computer background process insulated from a user of the computing device.

Clause 12. The computing device according to any of Clauses 10-11, wherein the computer-executable instructions, when executed by the processor, further cause the processor to locate one or more computer file folders predetermined for analysis to determine if one or more computer files associated with the one or more computer file folders are compatible for migration to the storage associated with the storage provider, the at least one computer file for migration associated with the one or more computer file folders.

Clause 13. The computing device according to any of Clauses 10-12, wherein the computer-executable instructions, when executed by the processor, further cause the processor to: identify a computer folder that comprises a plurality of computer files for migration to the storage; analyze at least one of the plurality of computer files to identify if the at least one of the plurality of computer files comprises at least one attribute corresponding to the at least one migration exclusion criterion; and prevent migration of the plurality computer files to the storage when the at least one of the plurality of computer files comprises at least one attribute corresponding to the at least one migration exclusion criterion.

Clause 14. The computing device according to any of Clauses 10-13, wherein the at least one migration exclusion criterion comprises a maximum file size in bytes, a maximum computer filename length, at least one improper computer file type identified by one or more file extensions, or a maximum computer file path length.

Clause 15. The computing device according to any of Clauses 10-14, wherein the at least one migration exclusion criterion comprises a plurality of migration exclusion criteria, the plurality of migration exclusion criteria including a maximum file size in bytes, a maximum computer filename length, at least one improper computer file type identified by one or more file extensions, and a maximum computer file path length.

Clause 16. The computing device according to Clause 15, wherein the obtain operation comprises obtaining the plurality of migration exclusion criteria, the analyze operation comprises analyzing the at least one computer file for migration to identify if the at least one computer file comprises at least one attribute corresponding to at least one of the plurality of migration exclusion criteria, and the prevent operation comprises preventing migration of the at least one computer file to the storage when the at least one computer file comprises at least one attribute corresponding to at least one of the plurality of migration exclusion criteria.

Clause 17. A computer implemented method, comprising: causing a computing device to: identify a plurality of computer files for migration to a storage associated with a storage provider; obtain at least one migration exclusion criterion; analyze the at least one computer file of the plurality of computer files for migration to identify if the at least one computer file comprises at least one attribute corresponding to the at least one migration exclusion criterion; and prevent migration of the plurality of computer files to the storage when the at least one computer file comprises at least one attribute corresponding to the at least one migration exclusion criterion.

Clause 18. The computer implemented method according to Clause 17, further comprising causing the computing device to execute the identify, obtain, analyze and prevent acts in association with a computer background process.

Clause 19. The computer implemented method according to any of Clauses 17-18, further comprising causing the computing device to locate one or more computer file folders predetermined for analysis to determine if one or more computer files associated with the one or more computer file folders are compatible for migration to the storage associated with the storage provider, the at least one computer file for migration associated with the one or more computer file folders.

Clause 20. The computer implemented method according to any of Clauses 17-19, wherein the at least one migration exclusion criterion comprises a maximum file size in bytes, a maximum computer filename length, at least one improper computer file type identified by one or more file extensions, or a maximum computer file path length.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to increase the amount of local storage available to a computing device. In some instances, abundant local storage available to a computing device enhances performance of a processor and the physical storage associated with the computing device.

To address at least this technical need, the implementations described herein provide enhanced data migration techniques that streamline migrating files and associated data from a local computing device storage to storage associated with a storage provider. In some instances, the enhanced data migration techniques significantly reduce the amount of user interaction with the computing device required to initiate and complete migration of files and associated data to the storage provider.

At least one benefit of the described data migration technologies is the reduction of unnecessary processor overhead associated with a computing device that possesses data storage that is at capacity or approaching capacity. The elimination of unnecessary processor overhead reduces battery drain and eliminates unnecessary memory use associated with computing devices.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method, comprising:
   identifying, by a computing device, at least one computer file or folder for migration to a storage associated with a storage provider;
   obtaining, by the computing device from the storage provider, at least one migration exclusion criterion indicative of an inability to process the at least one computer file or folder in a predictable manner at the storage associated with the storage provider;
   analyzing the at least one computer file or folder for migration to identify if the at least one computer file or folder comprises at least one attribute corresponding to the at least one migration exclusion criterion;
   preventing migration of the at least one computer file or folder to the storage when the at least one computer file or folder comprises at least one attribute corresponding to the at least one migration exclusion criterion;
   in advance of performing migration of files or folders, rendering a user interface on a display device associated with the computing device, the user interface indicating file system locations containing files or folders that meet the migration exclusion criterion and files or folders that do not meet the migration exclusion criterion, the user interface operative to:
      allow user selection of the files or folders that do not meet the migration exclusion criterion;
      disallow user selection of the files or folders that meet the migration exclusion criterion;
      indicate that transfer of the files or folders that meet the migration exclusion criterion has been prevented; and
      allow user input to re-select files or folders that do not meet the migration exclusion criterion subsequent to correction of issues that caused the re-selected files or folders to have previously met the migration exclusion criterion; and
   in response to receiving a user authorization, via the user interface, of the files or folders that do not meet the migration exclusion criterion, causing migration of the authorized files or folders.

2. The computer implemented method according to claim 1, further comprising:
   identifying a computer folder that comprises a plurality of computer files for migration to the storage;
   analyzing at least one of the plurality of computer files to identify if the at least one of the plurality of computer files comprises at least one attribute corresponding to the at least one migration exclusion criterion; and
   preventing migration of the plurality of computer files to the storage when the at least one of the plurality of computer files comprises at least one attribute corresponding to the at least one migration exclusion criterion.

3. The computer implemented method according to claim 1, wherein the obtaining comprises obtaining a plurality of migration exclusion criteria, the analyzing comprises analyzing the at least one computer file for migration to identify if the at least one computer file comprises one or more attributes corresponding to at least one of the plurality of migration exclusion criteria, and the preventing comprises preventing migration of the at least one computer file to the storage when the at least one computer file comprises one or more attributes corresponding to at least one of the plurality of migration exclusion criteria.

4. The computer implemented method according to claim 3, further comprising:
   identifying a computer folder that comprises a plurality of computer files for migration to the storage;
   analyzing at least one of the plurality of computer files to identify if the at least one of the plurality of computer files comprises one or more attributes corresponding to at least one of the plurality of migration exclusion criteria; and
   preventing migration of the plurality of computer files to the storage when the at least one of the plurality of computer files comprises one or more attributes corresponding to at least one of the plurality of migration exclusion criteria.

5. The computer implemented method according to claim 1, wherein the at least one migration exclusion criterion comprises a maximum file size in bytes, a maximum computer filename length, at least one improper computer file type identified by one or more file extensions, or a maximum computer file path length.

6. The computer implemented method according to claim 1, wherein the at least one migration exclusion criterion comprises a plurality of migration exclusion criteria, the plurality of migration exclusion criteria including a maximum file size in bytes, a maximum computer filename length, at least one improper computer file type identified by one or more file extensions, and a maximum computer file path length.

7. The computer implemented method according to claim 6, wherein the obtaining comprises obtaining the plurality of migration exclusion criteria, the analyzing comprises analyzing the at least one computer file for migration to identify if the at least one computer file comprises at least one attribute corresponding to at least one of the plurality of migration exclusion criteria, and the preventing comprises preventing migration of the at least one computer file to the storage when the at least one computer file comprises at least one attribute corresponding to at least one of the plurality of migration exclusion criteria.

8. The computer implemented method according to claim 1, further comprising locating one or more computer file folders predetermined for analysis to determine if one or more computer files associated with the one or more computer file folders are compatible for migration to the storage associated with the storage provider, the at least one computer file for migration associated with the one or more computer file folders.

9. The computer implemented method according to claim 1, further comprising executing the identifying, obtaining, analyzing and preventing acts in association with a computer background process.

10. A computing device, comprising:
    a processor;
    a computer-readable storage medium in communication with the processor, the computer-readable storage medium having computer-executable instructions stored thereupon which, when executed by the processor, cause the processor to:
    identify at least one computer file or folder for migration to a storage associated with a storage provider;
    obtain, from the storage provider, at least one migration exclusion criterion indicative of an inability to process the at least one computer file or folder in a predictable manner at the storage associated with the storage provider;
    analyze the at least one computer file or folder for migration to identify if the at least one computer file or folder comprises at least one attribute corresponding to the at least one migration exclusion criterion;

prevent migration of the at least one computer file or folder to the storage when the at least one computer file or folder comprises at least one attribute corresponding to the at least one migration exclusion criterion;

in advance of performing migration of files or folders, render a user interface on a display device associated with the computing device, the user interface indicating file system locations containing files or folders that meet the migration exclusion criterion and files or folders that do not meet the migration exclusion criterion, the user interface operative to:

allow user selection of the files or folders that do not meet the migration exclusion criterion;

disallow user selection of the files or folders that meet the migration exclusion criterion;

indicate that transfer of the files or folders that meet the migration exclusion criterion has been prevented;

allow user input to re-select files or folders that do not meet the migration exclusion criterion subsequent to correction of issues that caused the re-selected files or folders to have previously met the migration exclusion criterion; and in response to receiving a user authorization, via the user interface, of the files or folders that do not meet the migration exclusion criterion, cause migration of the authorized files or folders.

11. The computing device according to claim 10, wherein the computer-executable instructions, when executed by the processor, further cause the processor to execute the identify, obtain, analyze and prevent acts in association with a computer background process insulated from a user of the computing device.

12. The computing device according to claim 10, wherein the computer-executable instructions, when executed by the processor, further cause the processor to locate one or more computer file folders predetermined for analysis to determine if one or more computer files associated with the one or more computer file folders are compatible for migration to the storage associated with the storage provider, the at least one computer file for migration associated with the one or more computer file folders.

13. The computing device according to claim 10, wherein the computer-executable instructions, when executed by the processor, further cause the processor to:

identify a computer folder that comprises a plurality of computer files for migration to the storage;

analyze at least one of the plurality of computer files to identify if the at least one of the plurality of computer files comprises at least one attribute corresponding to the at least one migration exclusion criterion; and prevent migration of the plurality of computer files to the storage when the at least one of the plurality of computer files comprises at least one attribute corresponding to the at least one migration exclusion criterion.

14. The computing device according to claim 10, wherein the at least one migration exclusion criterion comprises a maximum file size in bytes, a maximum computer filename length, at least one improper computer file type identified by one or more file extensions, or a maximum computer file path length.

15. The computing device according to claim 10, wherein the at least one migration exclusion criterion comprises a plurality of migration exclusion criteria, the plurality of migration exclusion criteria including a maximum file size in bytes, a maximum computer filename length, at least one improper computer file type identified by one or more file extensions, and a maximum computer file path length.

16. The computing device according to claim 15, wherein the obtain operation comprises obtaining the plurality of migration exclusion criteria, the analyze operation comprises analyzing the at least one computer file for migration to identify if the at least one computer file comprises at least one attribute corresponding to at least one of the plurality of migration exclusion criteria, and the prevent operation comprises preventing migration of the at least one computer file to the storage when the at least one computer file comprises at least one attribute corresponding to at least one of the plurality of migration exclusion criteria.

17. A computer implemented method, comprising:
causing a computing device to:
identify a plurality of computer files or folders for migration to a storage associated with a storage provider;

obtain, from the storage provider, at least one migration exclusion criterion indicative of an inability to process the plurality of computer files or folders in a predictable manner at the storage associated with the storage provider;

analyze at least one computer file or folder of the plurality of computer files or folders for migration to identify if the at least one computer file or folder comprises at least one attribute corresponding to the at least one migration exclusion criterion;

prevent migration of the plurality of computer files or folders to the storage when the plurality of computer files or folders comprises at least one attribute corresponding to the at least one migration exclusion criterion;

in advance of performing migration of files or folders, render a user interface on a display device associated with the computing device, the user interface indicating file system locations containing files or folders that meet the migration exclusion criterion and files or folders that do not meet the migration exclusion criterion, the user interface operative to:

allow user selection of the files or folders that do not meet the migration exclusion criterion;

disallow user selection of the files or folders that meet the migration exclusion criterion;

indicate that transfer of the files or folders that meet the migration exclusion criterion has been prevented;

allow user input to re-select files or folders that do not meet the migration exclusion criterion subsequent to correction of issues that caused the re-selected files or folders to have previously met the migration exclusion criterion;

and in response to receiving a user authorization, via the user interface, of the files or folders that do not meet the migration exclusion criterion, cause migration of the authorized files or folders.

18. The computer implemented method according to claim 17, further comprising causing the computing device to execute the identify, obtain, analyze and prevent acts in association with a computer background process.

19. The computer implemented method according to claim 17, further comprising causing the computing device to locate one or more computer file folders predetermined for analysis to determine if one or more computer files associated with the one or more computer file folders are compatible for migration to the storage associated with the storage provider, the at least one computer file for migration associated with the one or more computer file folders.

20. The computer implemented method according to claim 17, wherein the at least one migration exclusion criterion comprises a maximum file size in bytes, a maximum computer filename length, at least one improper computer file type identified by one or more file extensions, or a maximum computer file path length.

* * * * *